Patented Sept. 11, 1951

2,567,468

UNITED STATES PATENT OFFICE 2,567,468

PROCESSES FOR MAKING ACTIVATED CARBON

Ernst Berl, deceased, late of Pittsburgh, Pa., by Walter George Berl, executor, Pittsburgh, Pa.

No Drawing. Original application September 23, 1942, Serial No. 459,438. Divided and this application April 27, 1948, Serial No. 23,615

14 Claims. (Cl. 252—444)

This invention relates to processes of manufacturing activated carbon, particularly briquetted activated carbon, and is a division of application Serial No. 459,438, September 23, 1942, now Patent No. 2,441,125, May 11, 1948.

While activated carbon is useful for many purposes, e. g. for the dechlorination of over-chlorinated water and for decolorization of sugar solutions, there is a great demand for it at the present time for the adsorption of vapors and gases, especially poisonous gases that may be used in chemical warfare and poisonous or solvent vapors that escape during industrial operations. For these purposes carbon in hard lumps of different particle sizes are desirable, if not necessary. Carbon produced from nut shells or hard wood can be manufactured with the preferred particle size and hardness. However, activated carbon in powdered form is produced in large quantities, either as a by-product of the processes of making the granular activated carbon or by special processes such as disclosed in United States Patents No. 1,812,316 and No. 1,851,888, Ernst Berl.

In order to use such powdered carbon for gas adsorption and for dechlorination of water and decolorization or other purposes, it may be desirable that the active carbon be formed into dense lumps of special shapes and sizes by a briquetting process and without reducing the adsorption capacity of the carbon per unit of weight. In replacing the light powder by dense pieces of desired geometric form, one gets increased adsorption capacity per unit of volume. The special geometric form, e. g. saddles, cylinders, etc., allows a lowering of pressure drop within the space filled with this formed activated carbon. This is of great importance for mouthpieces of gas masks and for industrial uses, e. g. recovery of solvent vapors.

When used for adsorbing solvent vapors incident to industrial operations such as the manufacture of rayon, smokeless powder, recovery of gasoline from natural gas, artificial leather, etc. these briquetted carbons are subjected to higher temperature, often above the boiling point of water, for example during steaming of material that contains adsorbed vapors or by drying the wet steamed carbon with hot air. Therefore, for this briquetting process it is necessary to use as binders substances which will not melt or decompose at or below such high temperature. The best way to carry out such a briquetting process is to use a binding material which in itself has active properties; in other words, active carbon may play the role of such a cementing material. In addition to these requirements for a satisfactory binder, other difficulties have been encountered in briquetting already activated hydrophobic carbon.

In many cases small quantities of binders do not bind the particles of this strongly hydrophobic material together strongly enough. Gas films on the activated carbon particles may be the reason for this behavior. When certain briquetted activated carbons are submitted to different temperatures, they are converted into fine powder. In other cases, the binder used substantially reduces the activity of the carbon. This is due to the fact that decomposition products of the binder, for instance pitch or starch, at higher temperatures form non-active, graphitic carbon which contains little bound hydrogen and oxygen. This so-called "secondary carbon" covers the active places of the real active carbon and deleteriously affects its activity.

Furthermore, the great demand for activated carbon requires that new and additional sources of raw materials be found to provide an adequate supply of activated carbon of desired qualities and at reasonable cost; and this in turn necessitates new or improved methods of treating the raw materials during this conversion process in order to get activated carbons which show a maximum adsorption capacity towards vapors, poison gases, dye stuffs and which react quickly and efficiently with those conversion compounds of halogens which are formed by the reaction of halogens with chlorinated water, e. g. hypochlorous acid.

Therefore, prime objects of this invention are to provide a novel and improved method of producing activated carbon, whereby numerous carbonaceous raw materials may be utilized to make a powdered activated, partly hydrophobic intermediate product; and to provide a new and improved method for forming said intermediate product at low cost into lumps of desired shape and particle size that will be retained after the conversion of this intermediate product into highly activated carbons which fulfill the requirements for gas adsorption, water dechlorination or decolorization operations, etc.

Another object of this invention is to provide a novel and improved method of briquetting intermediate products and powdered activated carbon including the utilization of new and especially effective binders, whereby the adsorption properties of the carbon shall not be deleteriously affected and briquets or lumps shall be capable of withstanding high temperatures, pressure and wear without disintegration.

Other objects, advantages and results of the invention will appear from the following description.

It has been found that these objects can be attained by a process which in general consists in utilizing such carbonaceous raw materials as water-soluble acid sludges from oil refineries, dense wood, lignite, waste sulphite liquor, etc., treating them with activating agents, for example potassium salts, pre-coalifying the resultant potassium salts of sulfonic and carboxylic acids and of phenols, and grinding the resulting material to open the large holes formed by gas during the first coalification process carried out between 300 and 600° C. Then for briquetting the powder the process proceeds by adding a finely powdered binder, such as a phenol formaldehyde resin, heating the mixture at temperatures of from 130° to 250° C. under high pressure, e. g. 500 to 10,000 p. s. i., thereby polymerizing the resin; during or before this polymerization operation shaping the mixture into lumps or particles of the desired form, e. g., small rods, saddles, plates, disks, cylinders, balls, etc., and then heating the formed material to temperatures between 800° C. and 1200° C.

More particularly describing the invention, it may be pointed out that during the pre-activation of different raw materials at temperatures between 300° and 500° C. the material itself goes often through a plastic stage. During this plastic stage a simultaneous development of gas composed of carbon dioxide, water and organic compounds—methane and homologues, etc.—takes place. More or less porous material results after the development of gases and vapors has reached an end. It is advantageous to heat the material which has to be activated in the presence or in the absence of activating agents to temperatures which are above those temperatures where the plastic stage exists and to maintain these temperatures until the development of cracking gases has ceased. Cooling of the material results in a more or less foamy mass of light weight. This mass which is brittle at room temperature is then pulverized. The larger holes which are responsible for the very light weight are opened and a brownish powder with higher apparent density results.

This preheated material produced from potassium compounds of sulfonic and carboxylic acids and of phenols which are present at the start or formed during the pre-activation already contains activating substances, for instance potassium sulfate, potassium sulfite, potassium carbonate, potassium sulfide, potassium cyanide, etc., or those activating substances may be added afterwards.

Potassium sulfate and potassium sulfite act at temperatures above 500° C. as oxidizing and corroding materials. They are converted at temperatures above 700° C. in absence of oxygen mostly into potassium sulfide. Potassium sulfate and potassium sulfite produce from the resulting intermediate products activated carbons with lower apparent density and somewhat larger capillaries so that vapors of substances with higher molecular weight, for instance chloropicrin, can enter these capillaries. The yield in activated carbon is lower, the adsorption of dyestuffs is increased, also the reactivity towards hypochlorous acid, HOCl and similar derivatives of bromine and iodine.

Potassium sulfide is also an activating substance. A potassium activation of the intermediate product obtained between 300-600° C. at the activation temperature between 800° and 1200° C. takes place as is the case with potassium sulfate. There is no oxidizing action by bound oxygen. Therefore, yields in activated carbon are increased, finer capillaries are produced so that vapors of higher molecular substances cannot enter very easily into these fine capillaries and be retained. The apparent density of the resulting activated carbons is somewhat higher than those which are produced in the presence of larger amounts of potassium sulfate. The decolorizing power is not as high as with the potassium-sulfate activated carbon.

By controlling the amount of the added potassium salt and its oxygen content in the mixture which has to be submitted to 800–1200° C., i. e., by changing the relationship between the organic material in the precoalified product to the potassium content and the oxygen content of these potassium compounds, it is possible to obtain different carbons in powder form or in form of larger, harder lumps with different apparent densities, different yields and different adsorption and decolorization power.

If briquetted material has to be produced, the binder is added to the intermediate product obtained at temperatures between 300° C. and 600° C. either with or after the addition of potassium salts. For this binder such material should be used which at high temperature decomposes and itself forms through reaction with the potassium salts present activated carbon which cements together the activated carbon produced from the ground mass. Very hard and dense particles of any desired geometric shape can be obtained in this way. It has been found that phenol formaldehyde resins, urea formaldehyde resins, resins with the basis of melamine, and similar resins are best suited for this purpose.

It is important that the material which has been partly degasified previously at moderate temperatures (300-600° C.) in order to get more dense material afterwards, should contain a certain amount of bound oxygen; in other words, it should have certain hydrophilic qualities. Under those conditions it is necessary to use only rather small amounts, 5–30%, of the right kind of binding resin to obtain the desired results.

Completely activated carbons with very little bound oxygen and hydrogen, due to the gas films formed on their surface and to their hydrophobic qualities, need more binder than the partly hydrophilic intermediate product produced at 300-600° C. One has to add also potassium compounds to this mixture of hydrophobic activated carbon and binder so that the following activation at elevated temperature (800–1200° C.) produces activated, cementing carbon from the binder material itself.

The preheated, partly hydrophilic, finely powdered, practically non-active material and, if necessary, another amount of activating substances, preferably potassium compounds, are mixed intimately with the finely powdered binder, for instance phenol formaldehyde resin. The resulting finely pulverized and thoroughly mixed material is formed into any geometric shape while it is submitted to higher temperature under pressure; this in order to avoid the formation of larger holes caused by the formation of steam and decomposition products produced from the polymerization reaction of the added resin. If submitted to higher pressure (500–10,000 p. s. i.) at temperatures between 110 and 250° C., preferably at about 180° C., the artificial resin is transformed into the so-called B and C stage. Then this polymerized synthetic resin cements together perfectly the particles of the precoalified material plus the activating substances, for instance potassium compounds.

The resulting, very hard and dense material is then subjected to higher temperatures between 800° and 1200° C., preferably to about 950° C. in absence of free oxygen. This can be done at normal, reduced or increased pressure. Then an activation process takes place without great change of the structure and the dimensions of the previously briquetted material. Inorganic, oxygen-containing material, for instance potassium sulfate or potassium sulfite, is reduced to potassium sulfide. This newly produced and formerly added potassium sulfide also acts as potassium-salt activator. It forms potassium-graphitic compounds $C_8K$ and $C_{16}K$ which decompose with water. They are responsible for part of the activation reaction. Sulfur present corrodes the surface of the newly produced, small crystallites by the formation of carbon disulfide, carbon oxysulfide and other volatile products. The organic material is converted into excellent dense, briquetted active carbon. After extraction with water of the potassium sulfide produced, hard structures with the necessary high apparent density are obtained, which prove to be excellent gas mask dechlorinating and decolorizing carbons.

It has been found that a mixture of organic material coalified at about 400° C., potassium compounds and synthetic resins, especially phenol formaldehyde resins, as binder give excellent results with a minimum of used resin. The resin itself in the presence of potassium compounds contributes to the activation process. About 50% of the weight of the dry resin is converted into an activated carbon which cements together the activated carbon particles resulting from the activation of the organic material.

The specific steps of the process may be varied as will be apparent from the following examples:

EXAMPLE 1

Water-soluble acid sludge from the oil refineries after separation of the free sulfuric acid present by the addition of 50–200% of water is converted by the addition of alkaline potassium compounds, for instance potassium hydroxide, potassium carbonate, potassium sulfide, etc., into the corresponding neutral potassium salts. According to the more or less complete separation of free sulfuric acid, less or more potassium sulfate may be formed also. The resulting neutral salts are then partly decomposed by heating them to temperatures between 300 and 600° C., preferably to about 400–450° C. There results a rather light powder which contains, besides organic substances, smaller amounts of water-insoluble potassium compounds bound chemically with the organic material and larger amounts of water-soluble, free potassium salts, mostly potassium sulfate. This powder can be used as such for further operations. If necessary or desired one may extract all or some of the potassium sulfate or add more of it. With or without the extraction of part or all of the potassium sulfate, potassium sulfide ($K_2S$) or other potassium compounds free of or poor in bound oxygen, e. g. potassium cyanide, potassium sulfocyanide, potassium cyanate, may be added. The organic substances which are formed by the coalification between 300 and 600° C. contain enough hydrophil oxygen-containing groups so that the resulting material wets rather easily with water and does not adsorb much gas. The activity of this brown organic residue is very low.

This material must be ground to very fine particle size in order to open the larger holes which have been formed by the development of gases through the previous heating. Then to this mixture finely powdered organic resins, for instance phenol formaldehyde resins are added. According to the fineness of the powder and its nature, 5–30%, preferably 7–12%, of phenol formaldehyde resins are used. The phenol formaldehyde resins may be utilized also in dissolved form.

This mixture of organic material plus potassium compounds with bound sulfur and phenol resin is then converted into the B and C resin stage by a treatment under pressure (1000–10,000 p. s. i.) at temperatures between 130 and 250° C., preferably at about 180° C. Through the polymerization of the phenol resin a perfect cementing of the organic material and potassium salts takes place. During or before this polymerization operation under pressure, the mixture can be converted into the desired geometric form, for instance into disks, plates, rods, cylinders, saddles, balls, etc.

The now resulting material must be submitted to activation temperatures between 800 and 1200° C., preferably between 900 and 1000° C. Then many reactions take place. At this high temperature a rearrangement of carbon atoms under formation of a graphite lattice occurs. The potassium compounds act as activating substances. They corrode the graphite-like material. Free, unsaturated valences are formed, as are also finer and coarser capillaries, in this now resulting material which is poor in bound oxygen and hydrogen. During this activation process the phenol formaldehyde resin in the presence of the potassium compounds is also converted into graphitic but active carbon which cements the carbon particles together.

Without change in the external structure of the previously formed material, activated carbon with excellent properties results. The following table shows the results of an accelerated chloropicrin test (49 mg. chloropicrin per 1000 cu. cm. and 1000 cu. cm. of air-chloropicrin mixture per sq. cm. and min.). Activated carbon made in the described way from water-soluble acid sludge is compared with gas mask carbon made from cocoanut shell as follows:

*Table I*

|  | Apparent density, g./ml. | Mg. chloropicrin adsorbed by 1 ml. active carbon | Ratio | Mg. chloropicrin adsorbed by 1 gr. active carbon | Ratio |
| --- | --- | --- | --- | --- | --- |
| acid sludge carbon | .35 | 315 | 100 | 900 | 100 |
| cocoanut carbon I shell | .42 | 252 | 80 | 600 | 67 |
| cocoanut shell carbon II | .45 | 225 | 71 | 500 | 55.6 |

It can be seen from these results that the activated gas-adsorbing carbon on a volume and weight basis is superior to gas carbons made from cocoanut shells which until now have been considered the best available material.

EXAMPLE 2

Instead of using phenol formaldehyde resins as described in Example 1, urea formaldehyde resins are used. Similar results are obtained.

EXAMPLE 3

Instead of using phenol formaldehyde resins as used in Example 1, or urea formaldehyde resins as used in Example 2, resin with the basis of melamine present similar results.

EXAMPLE 4

Potassium salts of water-soluble acid sludge are mixed according to U. S. Patent 1,851,888 with wood chips, dense, wood, or lignites, or bituminous coals. This intimate mixture to which, if necessary, potassium sulfate or potassium sulfite, or potassium sulfide may be added, is heated to temperatures of about 300–600° C., preferably between 400 and 450° C., in order to carry out the first step of a coalification process during which large amounts of coalification gases are formed. After having carried out the decomposition process at this moderate temperature, the material is ground up to very fine particle size, for instance less than 200 mesh. The material may be used as it is or further amounts of potassium sulfate, or potassium sulfide, or mixtures of potassium sulfate and potassium sulfide, may be added. It is permissible to extract some of the water-soluble potassium compounds rich in oxygen, and optionally other potassium compounds free of or poor in oxygen, for instance $K_2S$, KCN, KCNS, KCNO, may be added. To this very intimate mixture, resins as described in Examples 1, 2 and 3 are added in sufficient quantity, either in solid or in dissolved form. The mixture of coalified material, potassium salts and resin binder is then subjected to higher temperature (130–250° C.) and pressure (500–10,000 p. s. i.) and the formation of appropriate geometric forms may be carried out. This material should be subjected, preferably in the absence of oxygen, to temperatures between 800 and 1200° C., best between 900 and 1000° C. The activation process which is a corrosion process takes place. After the activation process has been carried out and the material has been cooled, the resulting $K_2S$ is extracted with water. It may be used for the neutralization of another batch of water-soluble acid sludge. The then resulting hydrogen sulfide may be converted into sulfur, or sulfuric acid, or oleum.

The resulting activated carbon may be extracted, if necessary or desired, with diluted hydrochloric acid in order to remove iron compounds and to decompose strongly adsorbed potassium sulfide or potassium polysulfide and may be washed with diluted ammonia. It may be reheated, if necessary or desired, to temperatures up to 500–700° C., the second heating removing sulfur which is formed from the decomposition of polysulfides. This sulfur otherwise occupies part of the active places of the gas carbon. The adsorbed sulfur can be removed also by any solvent for it, for instance warm benzene, dichlorbenzene, or watery sodium sulfite solutions.

The removal of the adsorbed sulfur by heating of the activated carbon to about 500–700° C. or by the extraction with organic or inorganic solvents increases the adsorption capacity towards vapors and dissolved dyestuff molecules about 5–20%.

The resulting activated carbon gives results similar to those described in Table I, Example 1.

EXAMPLE 5

Dense wood or lignite is mixed with potassium sulfate solution so that the dry mixture contains between 15 and 60% of potassium sulfate or potassium sulfide. This mixture is brought to temperatures up to 550° C., preferably between 400 and 450° C. The resulting coalified mass is pulverized so that large holes caused by the development of gas during the plastic stage are opened. This material then is mixed with artificial resins described in Examples 1, 2 and 3. Briquetting and heating processes are the same as described in Examples 1 and 4. The resulting potassium sulfide after the formation of activated carbon has taken place at high temperature, has to be removed by a systematic extraction with water. The activated carbon after having been briquetted or not may be submitted to a second heating process or extraction process as described in Example 4.

EXAMPLE 6

To waste sulfite liquor resulting from the production of sulfite pulp, potassium carbonate as a fine powder or in watery solution is added until the whole amount of calcium salts of lignin sulfonic acids is converted into water-soluble potassium compounds. The resulting solution of these potassium compounds is separated by sedimentation or filtration from the precipitated calcium carbonate. One may add to this solution potassium sulfate or potassium sulfide in order to change the activity of the finally resulting activated carbon. The neutral or alkaline liquid is then dried.

As hereinbefore stated, the qualities of the activated carbon can be regulated or varied by varying the ratio of potassium to organic substance and by controlling the ratio of oxygen bound on the potassium compounds to the organic substance. Most of the potassium is chemically bound in this mixture as potassium salt of lignin sulfonic acids. If desired, potassium sulphate or potassium sulphite, substances with a relatively large amount of bound oxygen, may be added to the dry material, or sulfide, cyanide or sulfocyanide of potassium having no bound oxygen may be added.

Using more potassium sulfate reduces the final yield in active carbon, decreases the apparent density which may go down to .06 and increases the adsorption capacity toward larger gas molecules and larger molecules like dyestuff molecules dissolved in liquids. Increasing the amount of potassium sulfide increases the yield and apparent density, decreases somewhat the adsorption capacity toward larger gas molecules without influencing the adsorption capacity for smaller gas molecules, and decreases somewhat the adsorption capacity towards larger molecules, for instance dyestuff molecules, dissolved in liquids.

The coalification steps come next. The dry material is subjected to temperatures between 300 and 600° C., best between 400 and 500° C. Then many processes take place. The carbohydrates present in the used waste sulfite liquor are converted into potassium salts of saccharine acids. Those saccharinic acid potassium salts form oxygen containing decomposition products poor in or free of potassium salts and into inorganic water-soluble potassium salts. During a certain temperature interval beginning at about 150° C. a large formation of gases takes place. After the development of gas has ceased, a foam-like material results which must be pulverized. To the now resulting material a binder and potassium salts may be added. Oxygen-containing potassium salts may be partly or completely removed by extraction with water and replaced partly or completely by oxygen-free potassium salts, for example $K_2S$. The binding and formation of the desired geometric structures at elevated temperatures and pressures takes place according to Examples 1 and 4. The now briquetted material is heated, according to Examples 1 and 4, to temperatures between 800 and 1200° C., best at 900–950° C. The treatment of the resulting activated carbon, which retains the former geometric shape, is carried out according to Examples 1 and 4. Again an excellent briquetted material results which is useful for gas mask purposes. Excellent activated carbons for dechlorination and decolorization of liquids can be obtained and used where a granular or otherwise larger sized activated carbon may be desired.

If desired, the coalification may be carried out in one step by heating the potassium salts of the lignin sulfonic acids and other compounds in the neutralized waste sulphite liquor, to a temperature of from 800–1200° C. preferably 900–950° C. Then many reactions take place. Internal combustion forms large amounts of carbon dioxide, water, hydrocarbons, and other volatile substances. About 50% of the sulfur bound originally in the form of lignin sulfonic acids is converted mostly into $SO_2$ and into free sulfur. Potassium sulfate and potassium sulfite formed at moderate temperatures (300–600° C.) from the potassium salts of lignin sulfonic acids and the potassium sulfate and potassium sulfide which have been added intentionally lose at the activation temperature (800–1200° C.) their oxygen and corrode strongly during their conversion into $K_2S$ the graphitic activated carbon. Small amounts of metallic potassium are formed which subdivide as compounds like $C_8K$ and $C_{16}K$ the graphitic crystals into units which contain only a few planes.

During this heating to 800–1200° C., preferably to 900–950° C., practically all potassium salt present is converted into potassium sulfide.

After extraction of the water-soluble material ($K_2S$), an excellent activated carbon is obtained.

Without change in the external structure of the previously formed material, activated carbon with excellent properties results. The following table shows the results of an accelerated chloropicrin test (49 mg. chloropicrin per 1000 cu. cm. and 1000 cu. cm. of air-chloropicrin mixture per sq. cm. and min.). Activated carbon made in the described way from water-soluble acid sludge is compared with gas mask carbon made from cocoanut shell as follows:

Table II

|  | Apparent density, g./ml. | Mg. chloropicrin adsorbed by 1 ml. active carbon | Ratio | Mg. chloropicrin adsorbed by 1 g. active carbon | Ratio |
| --- | --- | --- | --- | --- | --- |
| Waste sulfite pulp carbon | .362 | 316 | 100 | 873 | 100 |
| Cocoanut shell carbon I | .42 | 252 | 80 | 600 | 68.5 |
| Cocoanut shell carbon II | .45 | 225 | 71 | 500 | 57 |

EXAMPLE 7

In this waste sulfite liquor, besides higher molecular lignin derivatives, lower molecular carbohydrates are present. The latter can be separated from the lignin compounds either by fermentation or by osmosis. It is advantageous to submit the material obtained after treatment with potassium carbonate to these processes of fermentation or osmosis. The resulting material with little or no sugars has to be submitted to the same treatment as described in Example 6. The osmose sugars may be used either as such or as raw material for fermentation. Ethanol, acetone, butanol, citric acid, glycerine and other fermentation products may be obtained.

What is claimed is:

1. The steps in the process of making activated carbon, comprising heating a mixture of a potassium salt of a water-soluble tar acid from the production of oil products and of a carbonaceous material to 300–600° C., afterwards intimately mixing the thus formed product with a controlled amount of a water-soluble potassium compound being a member of the group consisting of potassium carbonate, potassium sulfate, potassium sulfite, potassium sulfide, potassium cyanide, potassium sulfocyanide, and potassium cyanate, activating said intimate mixture at temperatures from 800 to 1200° C., and extracting said last-named water-soluble potassium compound; whereby by increasing the ratio of chemically bound potassium to organic substance in the product, fine capillaries are produced in the final product, and by increasing the ratio of chemically bound oxygen to organic substance in the product formed by the first heating step the apparent density of the final product is lowered.

2. The steps in the process of making activated carbon, comprising heating a mixture of a potassium salt of a water-soluble tar acid from the production of oil products and a carbonaceous material to 300–600° C., afterwards intimately mixing the thus formed product with a controlled amount of water-soluble potassium compound being a member of the group consisting of potassium carbonate, potassium sulfate, potassium sulfite, potassium sulfide, potassium cyanide, potassium sulfocyanide and potassium cyanate, activating said intimate mixture at temperatures from 800 to 1200° C. and extracting said last-named water-soluble potassium compound, and removing adsorbed sulfur; whereby by increasing the ratio of chemically bound potassium to organic substance in the product, fine capillaries are produced in the final product, and by increasing the ratio of chemically bound oxygen to organic substance in the product formed by the first heating step the apparent density of the final product is lowered.

3. The steps in the process of making activated carbon, comprising heating a mixture of a potassium salt of a water-soluble tar acid from the production of oil products and of a carbonaceous material to 300–600° C., afterwards intimately mixing the thus formed product with a controlled amount of a water-soluble potassium compound being a member of the group consisting of potassium carbonate, potassium sulfate, potassium sulfite, potassium sulfide, potassium cyanide, potassium sulfocyanide and potassium cyanate, and with a resin binder, forming the intimate mixture into the desired geometric form, heating it to a temperature of from 110° C. to 250° C. at a pressure from about 500–10,000 p. s. i., activating the resulting product at a temperature from 800 to 1200° C., and extracting said last-named water-soluble potassium compound; whereby by increasing the ratio of chemically bound potassium to organic substance in the product formed by the first heating step, fine capillaries are produced in the final product, and by increasing the ratio of chemically bound oxygen to organic substance in the product formed by the first heating step the apparent density of the final product is lowered.

4. The steps in a process of making activated carbon, comprising heating a mixture of a potassium salt of a water-soluble tar acid from the production of oil products and carbonaceous material to 300–600° C., intimately mixing the thus formed product with a resin binder, forming said intimate mixture into the desired geometric form, polymerizing said resin, activating the resulting product at a temperature from about 800° C. to about 1200° C. in contact with potassium sulfide intimately intermingled with said product, and extracting residual potassium sulfide; whereby by increasing the ratio of chemically bound potassium to organic substance in the product formed by the first heating step, fine capillaries are produced in the final product.

5. The steps in a process of making activated carbon, comprising heating a potassium salt of a water-soluble tar acid from the production of oil products to a temperature between 300–600° C., afterwards intimately mixing the thus formed product with a controlled amount of a water-soluble potassium compound being a member of the group consisting of potassium carbonate, potassium sulfate, potassium sulfite, potassium sulfide, potassium cyanide, potassium sulfocyanide and potassium cyanate, activating said intimate mixture at temperatures from 800 to 1200° C., and extracting said last-named water-soluble potassium compound; whereby by increasing the ratio of chemically bound potassium to organic substance in the product formed by the first heating step, fine capillaries are produced in the final product, and by increasing the ratio of chemically bound oxygen to organic substance in the product formed by the first heating step the apparent density of the final product is lowered.

6. The steps in a process of making activated carbon, comprising heating a potassium salt of a water-soluble tar acid from the production of oil products to a temperature between 300–600° C., afterwards intimately mixing the thus formed product with a controlled amount of water-soluble potassium compound being a member of the group consisting of potassium carbonate, potassium sulfate, potassium sulfite, potassium sulfide, potassium cyanide, potassium sulfocyanide, and potassium cyanate, activating said intimate mixture at temperatures from 800 to 1200° C., and extracting said last-named water-soluble potassium compound and removing adsorbed sulfur; whereby by increasing the ratio of chemically bound potassium to organic substance in the product formed by the first heating step, fine capillaries are produced in the final product, and by increasing the ratio of chemically bound oxygen to organic substance in the product formed by the first heating step the apparent density of the final product is lowered.

7. The steps in a process of making activated carbon, comprising heating a potassium salt of a water-soluble tar acid from the production of oil products to a temperature between 300–600° C., afterwards intimately mixing the thus formed product with a water-soluble potassium compound being a member of the group consisting of potassium carbonate, potassium sulfate, potassium sulfite, potassium sulfide, potassium cyanide, potassium sulfocyanide and potassium cyanate, and with a resin binder, forming the intimate mixture into the desired geometric form, heating it to a temperature of from 110° C. to 250° C. at a pressure from about 500–10,000 p. s. i., activating the resulting product at a temperature from 800 to 1200° C., and extracting said last-named water-soluble potassium compound; whereby by increasing the ratio of chemically bound potassium to organic substance in the product formed by the first heating step, fine capillaries are produced in the final product, and by increasing the ratio of chemically bound oxygen to organic substance in the product formed by the first heating step, the apparent density of the final product is lowered.

8. The steps in a process of making activated carbon, comprising heating a potassium salt of a water-soluble tar acid from the production of oil products to 300–600° C., intimately mixing the thus formed product with a thermosetting resin binder, forming said intimate mixture into the desired geometric form, polymerizing said resin, heating the resulting product at a temperature from about 800° C., to about 1200° C., in contact with potassium sulfide intimately intermingled with the product, and extracting residual potassium sulfide; whereby by increasing the ratio of chemically bound potassium to organic substance in the product formed by the first heating step, fine capillaries are produced in the final product.

9. The steps in the process of making activated carbon, comprising heating a mixture of carbonaceous material and of a controlled amount of a water-soluble potassium compound being a member of the group consisting of potassium carbonate, potassium sulfate, potassium sulfite, potassium sulfide, potassium cyanide, potassium sulfocyanide and potassium cyanate to 300°–600° C., activating said intimate mixture at temperatures from 800 to 1200° C., and extracting said last-named water-soluble potassium compound; whereby by increasing the ratio of chemically bound potassium to organic substance in the product formed by the first heating step, fine capillaries are produced in the final product, and by increasing the ratio of chemically bound oxygen to organic substance in the product formed by the first heating step, the apparent density of the final product is lowered.

10. The steps in the process of making activated carbon, comprising heating a mixture of carbonaceous material thus formed and of a controlled amount of a water-soluble potassium compound being a member of the group consisting of potassium carbonate, potassium sulfate, potassium sulfite, potassium sulfide, potassium cyanide, potassium sulfocyanide and potassium cyanate to 300–600° C., activating said intimate mixture at temperatures from 800 to 1200° C. and extracting said last-named water-soluble potassium compound, and removing adsorbed sulfur; whereby by increasing the ratio of chemically bound potassium to organic substance in the product formed by the first heating step, fine capillaries are produced in the final product, and by increasing the ratio of chemically bound oxygen to organic substance in the product formed by the first heating step, the apparent density of the final product is lowered.

11. The steps in the process of making activated carbon, comprising heating a mixture of carbonaceous material and of a controlled amount of a water-soluble potassium compound being a member of the group consisting of potassium carbonate, potassium sulfate, potassium sulfite, potassium sulfide, potassium cyanide, potassium sulfocyanide and potassium cyanate to 300–600° C., intimately mixing the product thus formed with a thermosetting resin binder, forming the intimate mixture into the desired geometric form, heating it to a temperature of from 110° C. to 250° C. at a pressure from about 500–10,000 p. s. i., activating the resulting product at a temperature from 800 to 1200° C., and extracting said last-named water-soluble potassium compound; whereby by increasing the ratio of chemically bound potassium to organic substance in the product formed by the first heating step, fine capillaries are produced in the final product, and by increasing the ratio of chemically bound oxygen to organic substance in the product formed by the first heating step, the apparent density of the final product is lowered.

12. The steps in a process of making activated carbon, comprising heating a mixture of carbonaceous material and potassium sulfide to 300–600° C., intimately mixing the product thus formed with a thermosetting resin binder, forming said intimate mixture into the desired geometric form, polymerizing said resin, activating the resulting product at a temperature from about 800° C. to about 1200° C. in contact with potassium sulfide intimately intermingled with said product, and extracting residual potassium sulfide; whereby by increasing the ratio of chemically bound potassium to organic substance in the product formed by the first heating step, fine capillaries are produced in the final product.

13. The steps in the process of making activated carbon, comprising adding to carbonaceous material a water-soluble potassium sulfur compound, heating the mixture to between 400–550° C., pulverizing the thus formed product, intimately mixing the pulverized product with a thermosetting resin binder, forming the intimate mixture into the desired geometric form, and heating it to a temperature from 130° to 250° C. at a pressure from about 500–10,000 p. s. i., activating the resulting product at temperatures from 800 to 1200° C., and extracting said last-named water-soluble potassium compound; whereby by increasing the ratio of chemically bound potassium to organic substance in said product, fine capillaries are produced in the final product.

14. The process of claim 13, wherein said carbonaceous material is wood.

WALTER GEORGE BERL,
*Executor of the Estate of Ernst Berl, Deceased.*

REFERENCES CITED

The following references are of record in the file of this patent:

UNITED STATES PATENTS

| Number | Name | Date |
| --- | --- | --- |
| 1,968,846 | Morrell | Aug. 7, 1934 |
| 1,989,107 | Morrell | Jan. 29, 1935 |
| 2,008,144 | Morrell | July 16, 1935 |
| 2,056,854 | Hene | Oct. 6, 1936 |
| 2,377,063 | Adler | May 29, 1945 |
| 2,441,125 | Berl | May 11, 1948 |